(12) United States Patent
Oh et al.

(10) Patent No.: US 12,155,272 B2
(45) Date of Patent: Nov. 26, 2024

(54) MOTOR AND DRAIN PUMP WITH FIXING STRUCTURE BETWEEN THE ROTOR SHAFT

(71) Applicant: LG Electronics Inc., Seoul (KR)

(72) Inventors: Youngjin Oh, Seoul (KR); Daejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 17/398,819

(22) Filed: Aug. 10, 2021

(65) Prior Publication Data

US 2022/0316488 A1 Oct. 6, 2022

(30) Foreign Application Priority Data

Mar. 30, 2021 (KR) ........................ 10-2021-0041041

(51) Int. Cl.
| | |
|---|---|
| *H02K 1/28* | (2006.01) |
| *F04D 13/06* | (2006.01) |
| *H02K 1/27* | (2022.01) |
| *H02K 1/2733* | (2022.01) |
| *H02K 5/22* | (2006.01) |
| *H02K 7/00* | (2006.01) |
| *H02K 7/14* | (2006.01) |

(52) U.S. Cl.
CPC .............. *H02K 1/28* (2013.01); *F04D 13/06* (2013.01); *F04D 13/064* (2013.01); *H02K 1/2733* (2013.01); *H02K 5/225* (2013.01); *H02K 7/003* (2013.01); *H02K 7/14* (2013.01); *F05D 2260/30* (2013.01); *H02K 1/27* (2013.01)

(58) Field of Classification Search
None
See application file for complete search history.

(56) References Cited

U.S. PATENT DOCUMENTS

| | | | | |
|---|---|---|---|---|
| 2017/0047814 A1* | 2/2017 | Li | ............................ | F04D 29/22 |
| 2017/0310176 A1* | 10/2017 | Kawaguchi | ............ | H02K 15/03 |
| 2019/0383303 A1* | 12/2019 | Cho | ........................ | H02K 7/14 |
| 2022/0029487 A1* | 1/2022 | Sugiura | .................. | H02K 1/278 |

FOREIGN PATENT DOCUMENTS

| | | | | |
|---|---|---|---|---|
| CN | 111917205 A | * | 11/2020 | .............. H02K 1/28 |
| JP | 2002369423 A | * | 12/2002 | ............. H02K 1/185 |
| JP | 2018-133882 | | 8/2018 | |

(Continued)

OTHER PUBLICATIONS

Machine translation of KR-20130092733 (Obtained from USPTO Search Copyright 2023 Clarivate Analytics) (Year: 2023).*

(Continued)

*Primary Examiner* — Dominick L Plakkoottam
*Assistant Examiner* — Geoffrey S Lee
(74) *Attorney, Agent, or Firm* — Fish & Richardson P.C.

(57) ABSTRACT

Disclosed is a motor and a drain pump including the same. The motor includes a rotor, a rotation shaft positioned through a center of the rotor, and a shaft fixing member for supporting the rotor and the rotation shaft, in which the shaft fixing member and the rotor include a fixing device provided in a direction that intersects a rotation direction of the rotation shaft to prevent the rotation shaft from being idle.

13 Claims, 19 Drawing Sheets

(56) References Cited

FOREIGN PATENT DOCUMENTS

| KR | 1020070019148 | | 2/2007 | |
|---|---|---|---|---|
| KR | 20130092733 A | * | 8/2013 | ............... H02K 1/28 |
| WO | WO-2012101896 A1 | * | 8/2012 | ............... H02K 1/02 |
| WO | WO-2015080077 A1 | * | 6/2015 | ............ H02K 1/2733 |
| WO | WO-2015080078 A1 | * | 6/2015 | ............. F24F 1/0007 |
| WO | WO-2018151001 A1 | * | 8/2018 | ............. F04D 29/00 |

OTHER PUBLICATIONS

Machine translation of CN-111917205 (Obtained from USPTO Search Copyright 2023 Clarivate Analytics) (Year: 2023).*
Machine translation of WO-2015080078 (Obtained from USPTO Search Copyright 2023 Clarivate Analytics) (Year: 2023).*
Machine translation of JP-2002369423 (Obtained from USPTO Search Copyright 2023 Clarivate Analytics) (Year: 2023).*
Machine translation of WO-2021101896 (Obtained from USPTO Search Copyright 2023 Clarivate Analytics) (Year: 2023).*
Machine translation of WO-2015080077 (Obtained from USPTO Search Copyright 2023 Clarivate Analytics) (Year: 2023).*
Machine Translation of WO2018151001 (Obtained from USPTO Search) (Year: 2024).*
Office Action in Korean Appln. No. 10-2021-0041041, dated Feb. 9, 2023, 18 pages (with English translation).

* cited by examiner

MOTOR AND DRAIN PUMP WITH FIXING STRUCTURE BETWEEN THE ROTOR SHAFT

CROSS-REFERENCE TO RELATED APPLICATIONS

This application claims priority under 35 U.S.C. 119 and 365 to Korean Patent Application No. 10-2021-0041041, filed on Mar. 30, 2021 in the Korean Intellectual Property Office, the disclosure of which is incorporated herein by reference.

FIELD

The present disclosure relates to a motor and a drain pump including the same.

BACKGROUND

A drain pump is used in a clothing treatment apparatus, such as a washing machine or a dryer, or a dishwasher, and a one-way motor or a two-way motor is applied if necessary.

The drain pump needs to be capable of operating an impeller normally even under a condition in which the drain pump is submerged in water or in contact with water and includes an rotation shaft for rotation of the impeller.

The rotation shaft is coupled to a rotor of a motor. The rotor includes a magnet and is configured to have a ring shape.

When current is applied to the motor, the rotation shaft rotates integrally with the rotor. A shaft fixture is required to firmly couple the rotation shaft and the rotor.

When a conventional motor is used, coupling force of a part of the shaft fixture, for supporting of the rotor, is weakened or coupling between the shaft fixture and the rotor is released, and the rotation shaft is idle. To overcome this, a method of implementing a separate device or space for fixing the shaft fixture and the rotor may be considered.

The rotor of the motor may be molded by compressing and sintering a base material, e.g., metal in powder form at high temperature. In the molding process, the material is punched using a pressure device, and in this case, in order to prevent cracks from occurring in the rotor, a small step difference needs to be formed in a shape of the rotor in a direction in which the pressure device punches the material, or the density of a material of the rotor needs to be uniform.

CITED REFERENCE

Patent Document (Patent Document 1) Korean Patent Publication No. 10-2007-0019148 (Feb. 15, 2007)

SUMMARY

An object of the present disclosure is to a motor including a fixing device of a rotor, a shaft fixing member, and a rotation shaft to prevent the rotation shaft from being idle.

The present disclosure provides the motor in which the shaft fixing member is installed inside the rotor and the fixing device is installed in a direction that interferes with or intersects a rotation direction of the rotor in order to firmly couple the rotor and the rotation shaft.

The present disclosure provides the motor including the fixing device that is installed in the interfering direction and includes a fixing protrusion provided on any one of the rotor and the shaft fixing member and a fixing groove for supporting the fixing protrusion.

The present disclosure provides the motor in which the rotor has a ring shape formed through top and bottom and the fixing protrusion protrudes from an inner circumference of the rotor to firmly couple the shaft fixing member and the rotor.

The present disclosure provides the motor in which the fixing protrusion has a shape with a small step difference in a penetration direction of the rotation shaft to prevent cracks from occurring during a procedure of molding the rotor.

To this end, the present disclosure provides the motor in which the fixing protrusion has substantially the same step difference having a predetermined length or greater in a radial direction.

According to an embodiment of the present disclosure, a motor includes a rotor, a rotation shaft positioned through a center of the rotor, and a shaft fixing member for supporting the rotor and the rotation shaft, wherein the shaft fixing member and the rotor include a fixing device provided in a direction that intersects a rotation direction of the rotation shaft to prevent the rotation shaft from being idle.

The fixing device may include a fixing protrusion formed on any one of the rotor and the shaft fixing member, and a fixing groove formed in the other one of the rotor and the shaft fixing member, for supporting the fixing protrusion. Due to interference between the fixing protrusion and the fixing groove, the shaft fixing member may be prevented from being separated from the rotor during a procedure in which the rotor rotates.

The fixing device may include a fixing protrusion formed on the rotor and a fixing groove formed in the shaft fixing member.

The rotor may have a ring shape, and may include an outer circumference and an inner circumference. The fixing protrusion may be formed on the inner circumference of the rotor, and the fixing groove may be formed on a flange of the shaft fixing member.

The rotation shaft may extend in upward and downward directions, and the fixing protrusion may be formed on a taper part for connecting an upper part of the rotor and the inner circumference of the rotor. Thus, the fixing protrusion may be formed at a lower position than the upper part of the rotor.

The rotation shaft may extend in upward and downward directions, and the fixing protrusion may be formed on a taper part for connecting the lower part of the rotor and the inner circumference of the rotor. Thus, the fixing protrusion may be provided at a higher position than the lower part of the rotor.

The fixing protrusion may be provided at a height level between the upper and lower parts of the rotor, and thus the shaft fixing member may easily support the upper and lower parts of the rotor while supporting the fixing protrusion.

The rotor may include a taper part provided to be inclined toward the inner circumference from the upper part or toward the inner circumference from the lower part, and may prevent cracks from occurring during a procedure of molding the motor compared with the case in which the taper part extends in a direct downward direction toward the inner circumference from the upper part (or the lower part).

The outer circumference of the fixing protrusion may have a shape forming a portion of an outer circumference of a cylinder. Due to this configuration, the upper part of the fixing protrusion may extend in a radial direction of the rotor by a predetermined length or more, thereby preventing cracks from occurring during a procedure of molding (punching process) the rotor.

The fixing protrusion may be provided to correspond to the number of poles of a magnet of the rotor, and thus, may form a uniform magnetic field based on a rotation direction of the rotor.

According to an embodiment of the present disclosure, a motor includes a rotation shaft, a permanent magnet disposed at a side of an outer circumference of the rotation shaft and including an outer circumference part and an inner circumference part to have a ring shape, and a shaft fixing member for fixing the permanent magnet and the rotation shaft.

The permanent magnet may further include a fixing protrusion that protrudes in a direction intersecting a rotation direction of the permanent magnet from the inner circumference part and interferes with the shaft fixing member.

The shaft fixing member may form a fixing groove for accommodating the fixing protrusion therein.

The permanent magnet may further include a fixing protrusion that protrudes in a direction that intersects a rotation direction of the permanent magnet from the inner circumference part and interferes with the shaft fixing member.

The permanent magnet may include a first end extending in an inner radial direction of the permanent magnet from one side of the outer circumference part, and a second end extending in the inner radial direction of the permanent magnet from another side of the outer circumference part.

The fixing protrusion may be positioned close to a center of an inside of the permanent magnet than the first end or the second end.

The fixing protrusion may be formed on the inner circumference part of the permanent magnet.

The inner circumference part of the permanent magnet may include a first inner circumference part having a ring shape, and a second inner circumference part protruding in a direction toward the first end or the second end from the first inner circumference part and forming one surface of the fixing protrusion.

The one surface of the fixing protrusion may form an innermost surface of the fixing protrusion in a radial direction.

A distance to a tip of the fixing protrusion from the first inner circumference may be less than a distance to the first end or the second end from the first inner circumference to prevent the fixing protrusion from protruding out of the first end or the second end.

The permanent magnet may include a taper part extending to be inclined toward an inside of the permanent magnet from the first end, and an inner extension extending in the inner radial direction of the permanent magnet from the taper part.

The fixing protrusion may be formed on at least one of the taper part and the inner extension.

The fixing protrusion may be formed across the taper part and the inner extension.

The fixing protrusion may include a protrusion outer circumference part having a predetermined curvature to have a shape of a portion of an outer circumference of a cylinder.

The fixing protrusion may be provided in plural in a circumferential direction of the inner circumference part of the permanent magnet, and two of the plurality of fixing protrusions may overlap a portion and another portion of the outer circumference of the cylinder, respectively.

The fixing protrusion may be provided in six to correspond to a number of poles of the permanent magnet, and first and fourth fixing protrusions of the six fixing protrusions may constitute a portion of an outer circumference of a first cylinder.

Second and fifth fixing protrusions of the six fixing protrusions may constitute a portion of an outer circumference of a second cylinder.

Third and sixth fixing protrusions of the six fixing protrusions may constitute a portion of an outer circumference of a third cylinder.

The fixing protrusion may be formed at each side of an inner circumference of the first end and an inner circumference of the second end.

The shaft fixing member may include a first step support extending in an outer radial direction from one side of the magnet support and covering a portion of the first end of the magnet, and a second step support extending in an outer radial direction from another side of the magnet support and covering a portion of the first end of the magnet.

The fixing groove may be formed in a flange formed by the magnet support and the first step support or by the magnet support and the second step support.

The flange may include a flange part having an inclined surface supported by the taper part of the permanent magnet, and the fixing groove may be recessed in the flange part.

DETAILED DESCRIPTION

Hereinafter, detailed embodiments will be described in detail with reference to the accompanying drawings. It should be understood that embodiments described herein are illustratively shown to aid in understanding of the present disclosure, and the present disclosure may be implemented with various modifications different from the embodiments described herein. In addition, in order to help understanding of the present disclosure, the accompanying drawings are not drawn to scale, but dimensions of some components may be exaggerated.

Figure 1:
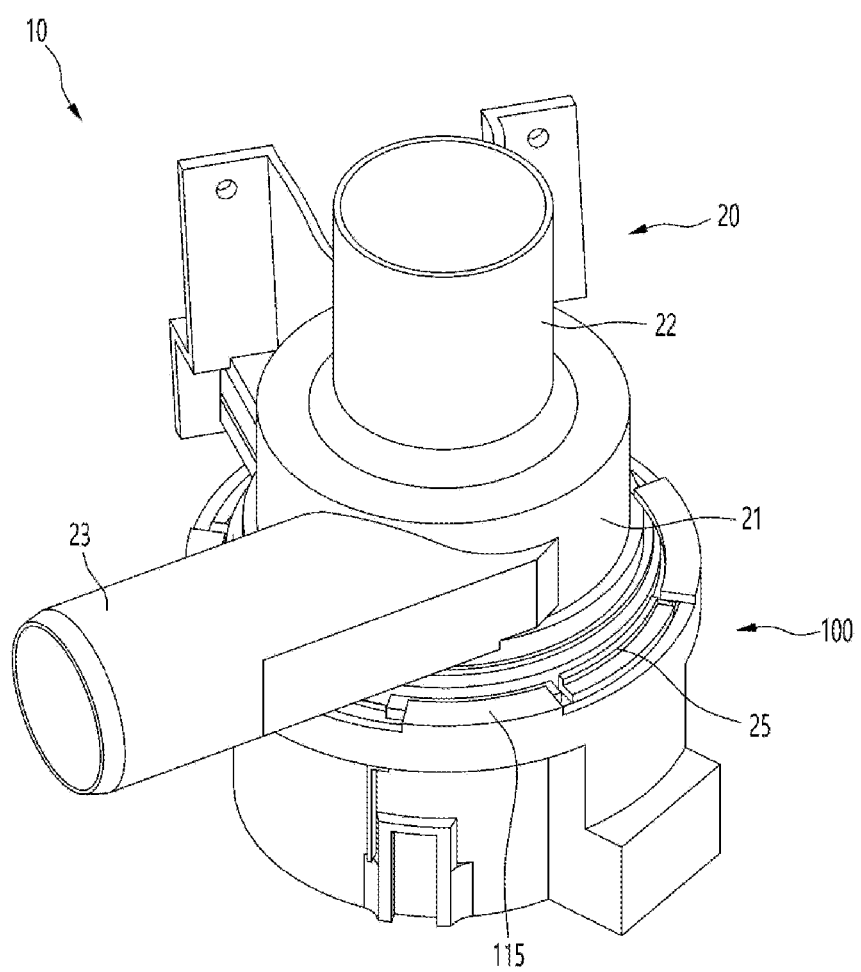
FIG. 1 is a perspective view of a drain pump according to an embodiment of the present disclosure.
Figure 2:
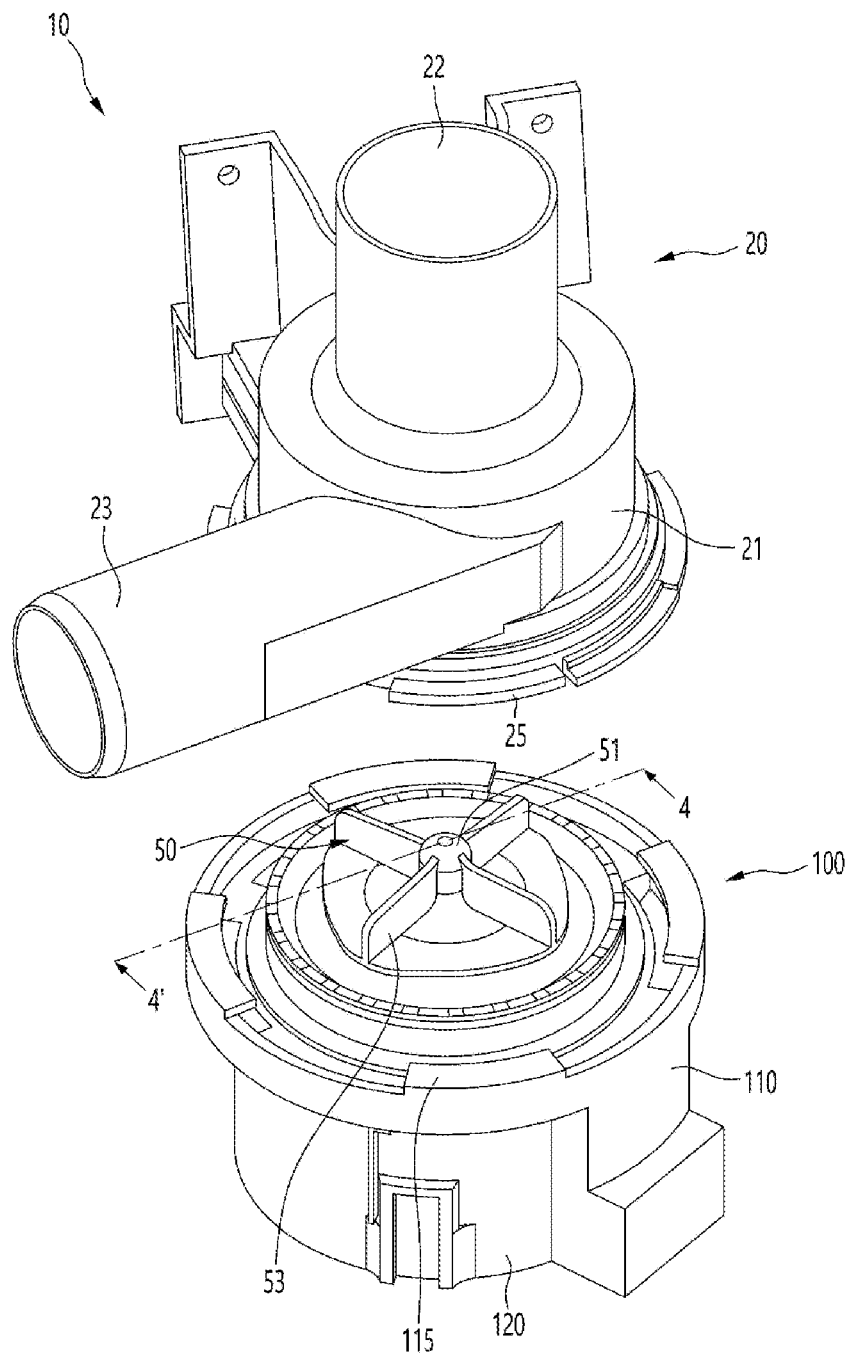
FIG. 2 is an exploded perspective view of the drain pump.
Figure 3:
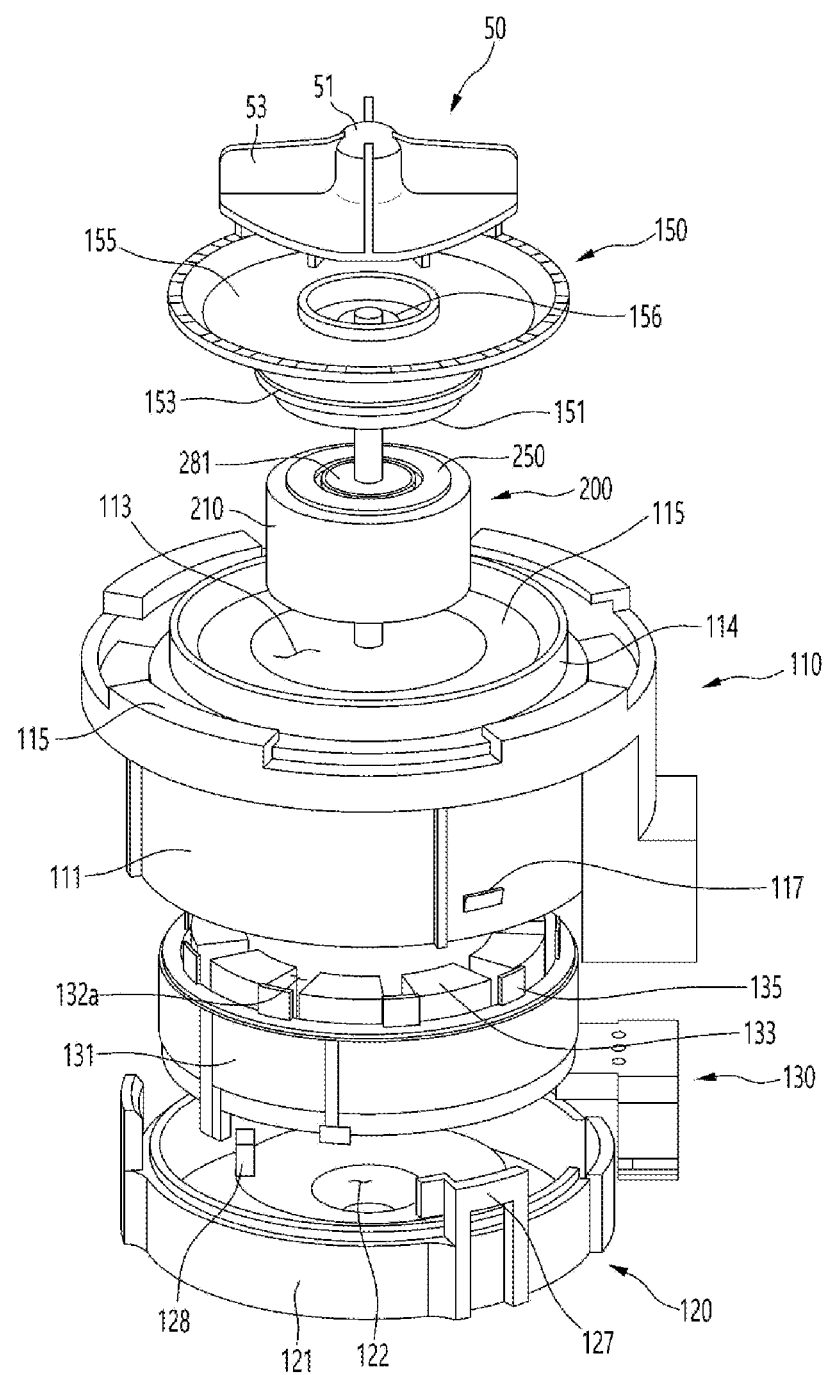
FIG. 3 is an exploded perspective view of a motor assembly according to an embodiment of the present disclosure.
Figure 4:
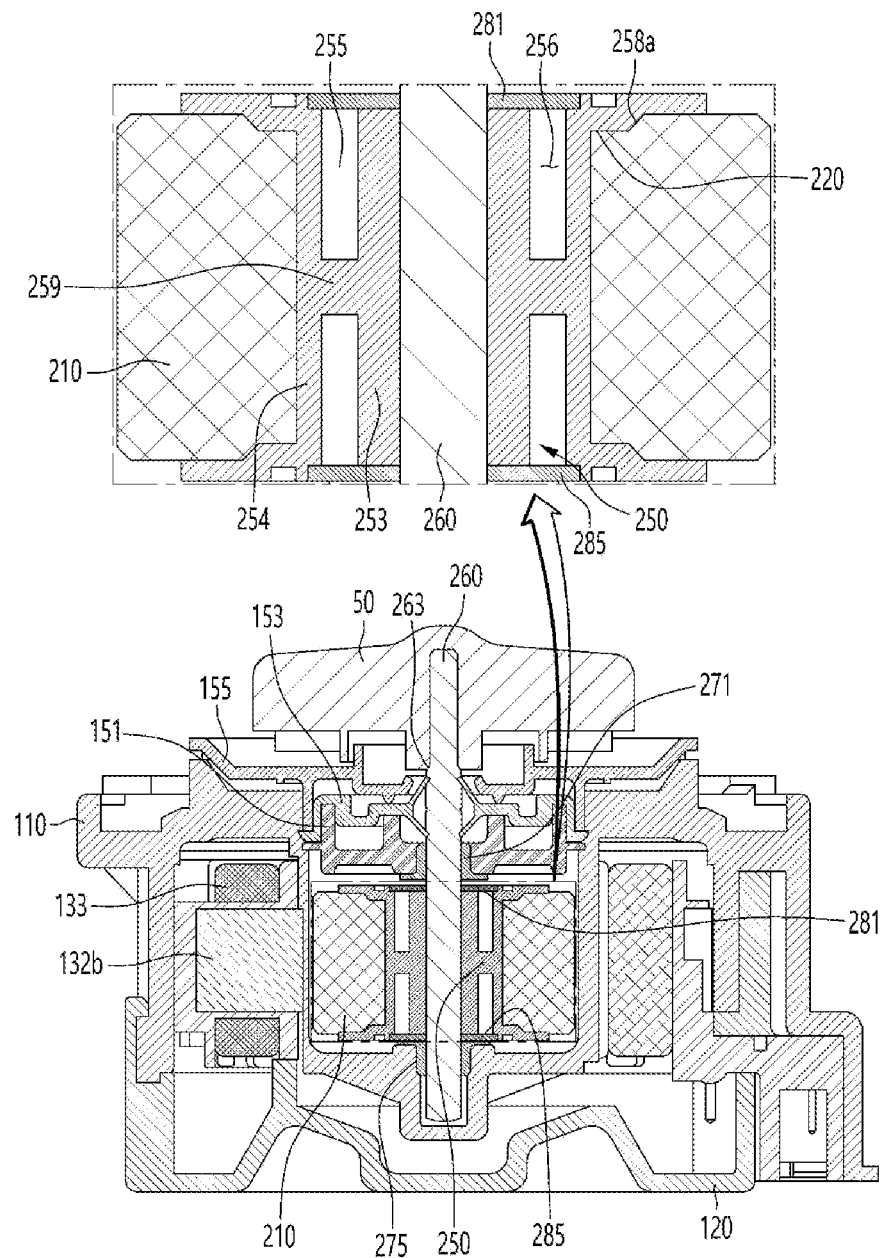
FIG. 4 is a cross-sectional view taken along 4-4' of FIG. 2.
Figure 5:
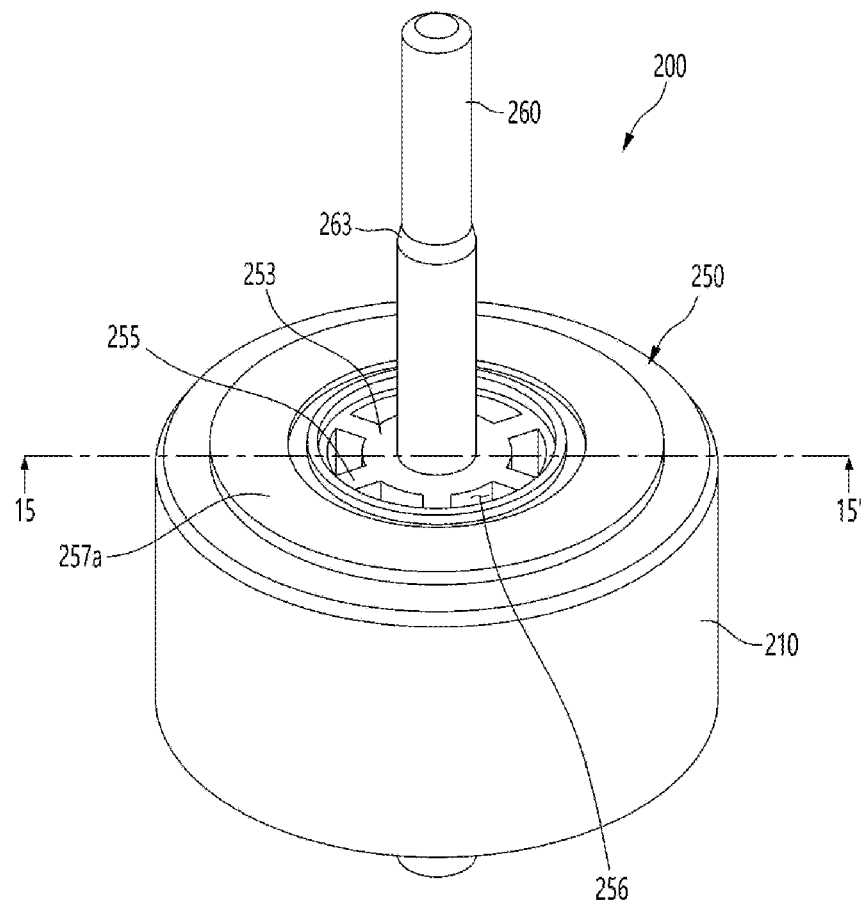
FIG. 5 is a perspective view showing the case in which a rotor and a rotation shaft are coupled according to an embodiment of the present disclosure.
Figure 6:
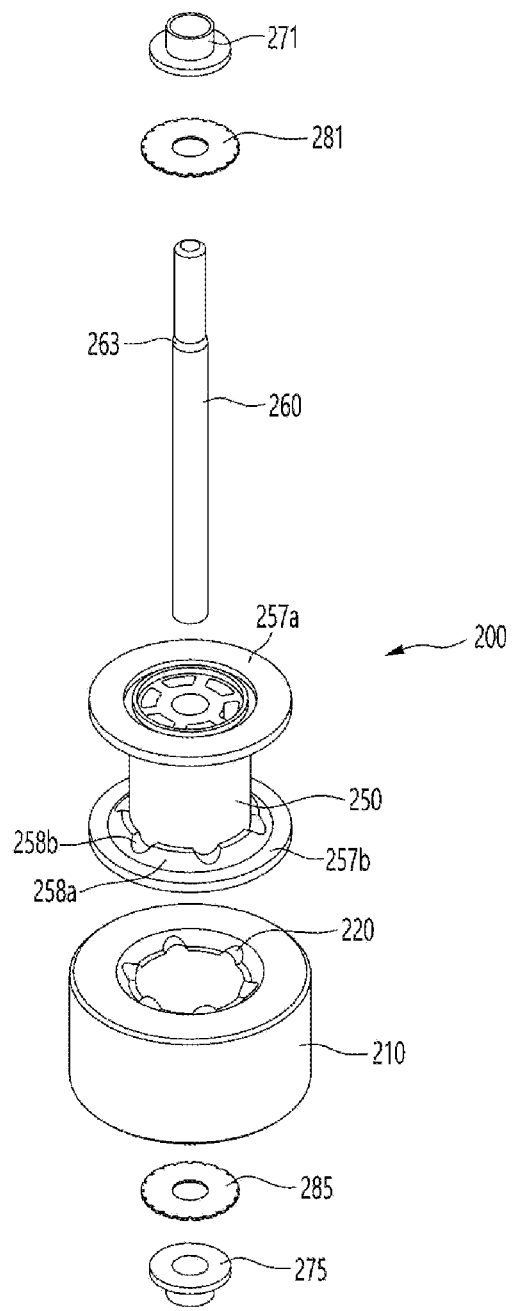
FIG. 6 is an exploded perspective view showing a rotor, a rotation shaft, and nearby components thereof according to an embodiment of the present disclosure.

FIG. 1 is a perspective view of a drain pump according to an embodiment of the present disclosure. FIG. 2 is an exploded perspective view of the drain pump. FIG. 3 is an exploded perspective view of a motor assembly according to an embodiment of the present disclosure. FIG. 4 is a cross-sectional view taken along 4-4' of FIG. 2. FIG. 5 is a perspective view showing the case in which a rotor and a rotation shaft are coupled according to an embodiment of the present disclosure. FIG. 6 is an exploded perspective view showing a rotor, a rotation shaft, and nearby components thereof according to an embodiment of the present disclosure.

Referring to FIGS. 1 to 6, a drain pump 10 according to an embodiment of the present disclosure may include a pump casing 20. The pump casing 20 may include a casing body 21 for forming a storage space of water. An impeller 50 may be rotatably accommodated in the casing body 21. For example, the casing body 21 may have a cylindrical shape.

The pump casing 20 may include a water inlet 22 that is installed in the casing body 21 to introduce water thereinto. The water inlet 22 may protrude from an outer circumference of the casing body 21 to introduce water in an axial direction of the impeller 50 installed in the casing body 21.

The pump casing 20 may further include a water outlet 23 that is installed in the casing body 21 to discharge water. The water outlet 23 may protrude in a tangential direction with respect to an outer circumference of the casing body 21.

The drain pump 10 may further include a motor assembly 100 coupled to the pump casing 20. The pump casing 20 may include a protrusion 25, and the motor assembly 100 may include a locking rib 115 coupled to the protrusion 25.

The motor assembly 100 may include the impeller 50 and motor housings 110 and 120.

The impeller 50 may include an impeller hub 51 installed at a central part of the impeller 50 and coupled to a rotation shaft 260, and a plurality of blades 53 that extend in a radial direction from an outer circumference of the impeller hub 51.

A motor may be installed inside the motor housings 110 and 120.

The motor housings 110 and 120 may include a first housing 110 and a second housing 120, and an internal space defined by the first and second housings 110 and 120 may form a motor accommodating space 122 for accommodating the motor therein.

The first housing 110 may be configured to surround a top surface of a stator 130 and may prevent flame from spreading to the outside in case of fire.

The first housing 110 may include a first housing body 111 hollow inside. A rotor accommodating part 113 in which a rotor 200 is accommodated may be formed inside the first housing body 111. The rotor accommodating part 113 may be formed to open an upper part of the first housing body 111.

Directions are now defined. The upper part of the first housing body 111 may be understood to be an end of the first housing body 111, which faces the impeller 50, and a lower part of the first housing body 111 may be understood to be an opposite end to the upper part.

An accommodating surface 115 on which a packing device 150 is put may be formed on the upper part of the first housing body 111. The accommodating surface 115 may have an annular shape, and the rotor accommodating part 113 may be formed inside the accommodating surface 115.

The first housing 110 may further include a housing protrusion 114 that is provided along a circumference of the accommodating surface 115 and protrudes from the accommodating surface 115 in a direction in which the impeller 50 is directed. For example, the housing protrusion 114 may have a ring shape.

The packing device 150 may be provided above the first housing 110. The packing device 150 may prevent water or foreign substances of the pump casing 20 from penetrating into the motor and may cover the motor to prevent the rotor 200 from being separated from the rotor accommodating part 113.

The packing device 150 may include a packing base 151 that is rotatably coupled to the rotation shaft 260. The rotation shaft 260 may be positioned through the packing base 151.

The packing device 150 may further include a sealing member 153 accommodated on the packing base 151. The sealing member 153 may have an outer circumference in contact with an inner circumference of the rotor accommodating part 113.

The packing device 150 may further include a packing cover 155 that is provided above the packing base 151 and presses the sealing member 153 in a downward direction to fix the sealing member 153 to the packing base 151.

A shaft penetration part 156 into which the rotation shaft 260 is rotatably inserted may be formed in a central part of the packing cover 155. The rotation shaft 260 may extend upward from the rotor accommodating part 113 and may protrude upward through the packing base 151, the sealing member 153, and the packing cover 155.

The impeller 50 may be put above the packing cover 155 and may be coupled to the rotation shaft 260.

The second housing 120 may be configured to surround a lower surface of the stator 130 and may prevent flame from spreading to the outside in case of fire.

The second housing 120 may include a second housing body 121 coupled to a lower side of the first housing 110. A hook 117 may be provided on an outer circumference of the first housing body 111, and a hook rib 127 coupled to the hook 117 may be provided on an outer circumference of the second housing body 121.

A support protrusion 128 for supporting the stator 130 of the motor may be provided in the second housing body 121. The support protrusion 128 may protrude upward from a bottom surface of the second housing body 121.

The motor for generating torque may be provided in the motor accommodating space 122 of the first and second housings 110 and 120. The motor may include the stator 130 and the rotor 200.

The rotor 200 may be referred to as an inner motor type motor in that the rotor 200 is provided inside the stator 130.

The stator 130 may include a stator core 131 formed by stacking a plurality of sheets in a circumferential direction to form a cylindrical shape. The sheet may include a plurality of slots 132a and a plurality of teeth 132b.

The stator 130 may further include a coil 133 wound around the stator core 131. The coil 133 may be wound around the teeth 132b between the slots 132a of the stator core 131.

The stator 130 may further include an insulator 135 that is interposed between the stator core 131 and the coil 133 and performs an insulation function.

When voltage is applied to the stator 130, current may flow in the coil 133, the stator 130 may generate a rotating field to rotate the rotor 200.

The rotor 200 may include a magnet 210, a shaft fixing member 250 for supporting the magnet 210, and the rotation shaft 260 inserted into and coupled to the center of the shaft fixing member 250.

The magnet 210 may include a permanent magnet that is rotated by the rotating field of the stator 130.

The magnet 210 may have a ring shape (annular shape) and may be defined by an upper surface, a lower surface, an inner circumference, and an outer circumference. The upper surface of the magnet 210 may face the impeller 50, and the lower surface of the magnet 210 may face the upper surface.

The magnet 210 may be manufactured through power metallurgy. The power metallurgy may be defined as a method of manufacturing a metal object by melting metal using metal powders to have a desired shape. In detail, the power metallurgy may be understood as a compression sintering method of manufacturing metal powders or alloy powders and manufacturing a metal product by compacting these powders and then sintering the resultant at a temperature equal to or less than a melting temperature.

For example, the magnet 210 may be manufactured using iron powders.

The shaft fixing member 250 may be provided on an inner circumference of the magnet 210 and may be provided to surround an outer circumference of the rotation shaft 260. A portion of the shaft fixing member 250 may be positioned to cover portions of upper and lower surfaces of the magnet 210.

The shaft fixing member 250 may be formed using an insert molding method. In detail, the shaft fixing member 250 may be filled with resin via insert molding in the state in which the rotation shaft 260 is disposed in the magnet 210.

The shaft fixing member 250 may include a shaft support 253 that surrounds the outside of the rotation shaft 260. The shaft support 253 may have a cylindrical shape formed through top and bottom, and a shaft insertion part 251 into which the rotation shaft 260 is inserted may be formed in the shaft support 253.

The shaft support 253 may be in contact with the outer circumference of the rotation shaft 260 and may be coupled thereto. For example, a horizontal or inclined groove may be formed in the outer circumference of the rotation shaft 260 to couple the shaft support 253 to the rotation shaft 260 using a knurling method.

The shaft fixing member 250 may further include a magnet support 254 that surround the outside of the shaft support 253 and supports the inner circumference of the magnet 210. The magnet support 254 may have a cylindrical shape formed through top and bottom, and may be in contact with the magnet 210 and may be coupled thereto.

The shaft fixing member 250 may further include a first connector 255 for connecting the shaft support 253 and the magnet support 254. The first connector 255 may radially extend toward the magnet support 254 from the shaft support 253.

The first connector 255 may extend a long way in upward and downward directions to the lower part from an upper part of the shaft fixing member 250.

The first connector 255 may be provided in plural, and the plurality of first connectors 255 may be spaced apart from each other in a circumferential direction.

The shaft fixing member 250 may include a recess 256 defined by the shaft support 253, the magnet support 254, and two adjacent first connectors 255. The recess 256 may be formed by recessing the upper part of the shaft fixing member 250 or formed by recessing the lower part of the shaft fixing member 250.

The recess 256 may function as a slimming groove for preventing the shaft fixing member 250 from being deformed during injection molding while reducing the weight of the rotor 200.

The shaft fixing member 250 may further include a second connector 259 that is installed inside the recess 256 and connects the shaft support 253 and the magnet support 254.

The second connector 259 may radially extend toward the magnet support 254 from the shaft support 253.

The second connector 259 may be positioned approximately in the middle based on a vertical height from the upper part to the lower part of the shaft fixing member 250.

The shaft fixing member 250 may include a first step support 257a for covering a portion of the upper part of the magnet 210 and a second step support 257b for covering a portion of the lower part of the magnet 210. Due to the first and second step supports 257a and 257b, the shaft fixing member 250 may stably support the upper and lower parts of the magnet 210 as well as the inner circumference of the magnet 210.

A fixing device may be provided in a direction that intersects a rotation direction of the rotor 200 to prevent the rotation shaft 260 from being idle by firmly coupling the shaft fixing member 250 and the magnet 210.

The fixing device may include a magnet protrusion 220 formed on the magnet 210 and a fixing groove 258 formed in the shaft fixing member 250. The magnet protrusion 220 may be formed on the inner circumference of the magnet 210, and the fixing groove 258 may be recessed in an external surface of the shaft fixing member 250 to accommodate the magnet protrusion 220.

The rotation shaft 260 may be positioned through the inside of the shaft fixing member 250. The rotation shaft 260 may protrude in an upward direction of the shaft fixing member 250 and may be inserted into the impeller 50.

The rotation shaft 260 may include a support flange 263 for supporting the impeller 50. The support flange 263 may protrude in a circumferential direction from the outer circumference of the rotation shaft 260 and support a bottom surface of the impeller 50. The impeller 50 and the rotation shaft 260 may be stably coupled by supporting the impeller 50 by the support flange 263.

The rotation shaft 260 may be formed with a lower diameter being larger than an upper diameter based on the support flange 263.

The rotor 200 may further include bearings 271 and 275 for radially supporting the rotation shaft 260 to prevent the rotation shaft 260 from being damaged while rotating.

The bearings 271 and 275 may include a first bearing 271 for supporting a portion of the rotation shaft 260, which is positioned above the shaft fixing member 250 and protrudes in an upward direction of the shaft fixing member 250, and a second bearing 275 for supporting a portion of the rotation shaft 260, which is positioned below the shaft fixing member 250 and protrudes in a downward direction of the shaft fixing member 250.

The bearings 271 and 275 may be formed of a plastic material.

The rotor 200 may further include washers 281 and 285 provided on the shaft fixing member 250. The washers 281 and 285 may include a first washer 281 installed at the upper part of the shaft fixing member 250 and a second washer 285 installed at the lower part of the shaft fixing member 250.

The washers 281 and 285 may perform a function of preventing one surface of the bearings 271 and 275 and one surface of the shaft fixing member 250 from wearing and being damaged, respectively. The washers 281 and 285 may have a smooth surface, and even if the bearings 271 and 275 wear, a wear rate of the bearings 271 and 275 may be low.

Figure 7:
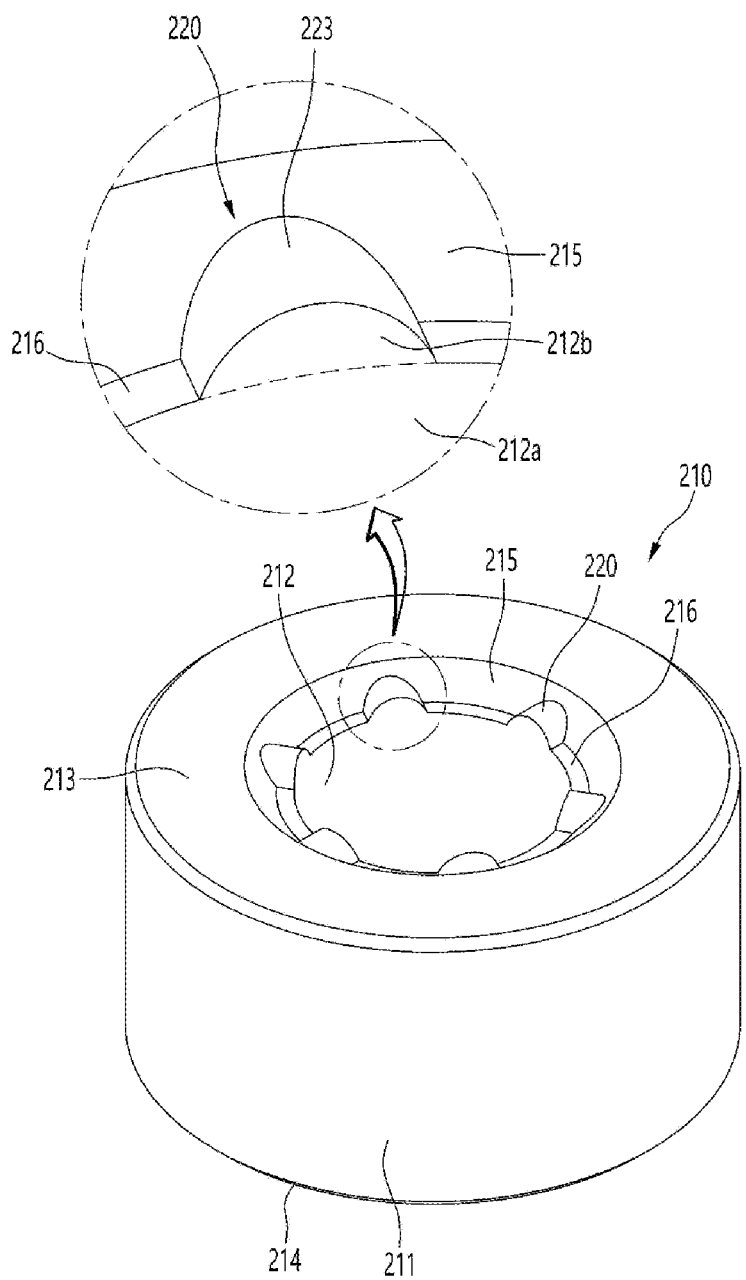
FIG. 7 is a perspective view showing the configuration of a rotor according to an embodiment of the present disclosure.
Figure 8:
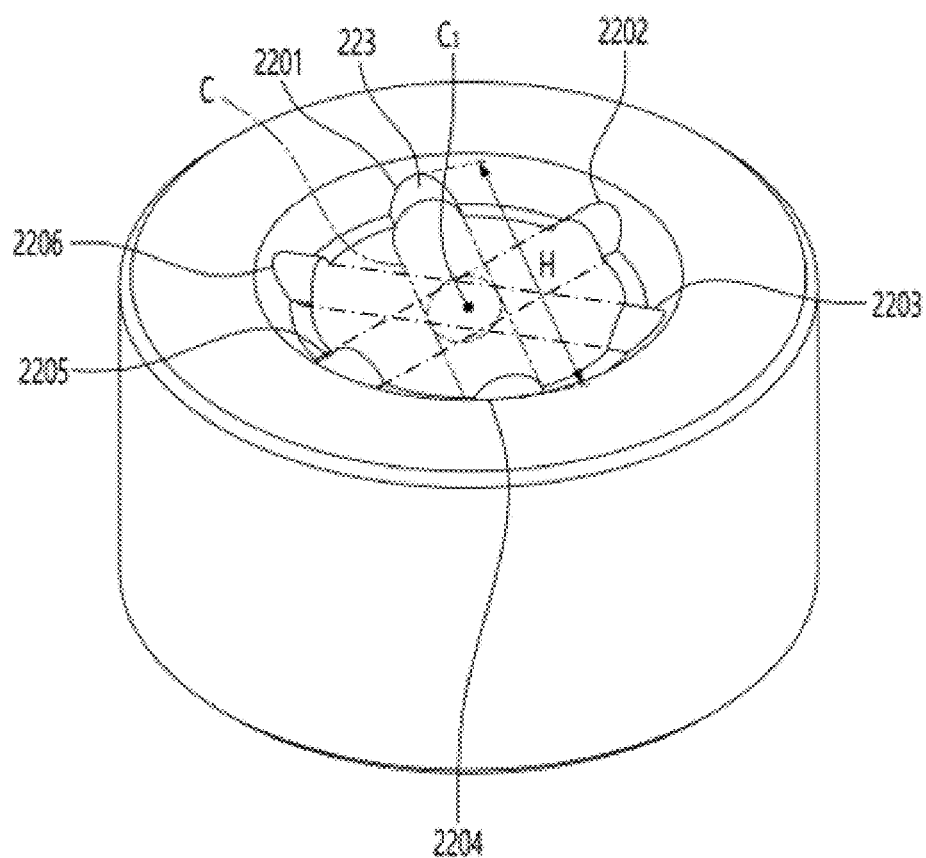
FIG. 8 is a schematic diagram showing a shape of a fixing protrusion of a rotor according to an embodiment of the present disclosure rotor.
Figure 9:
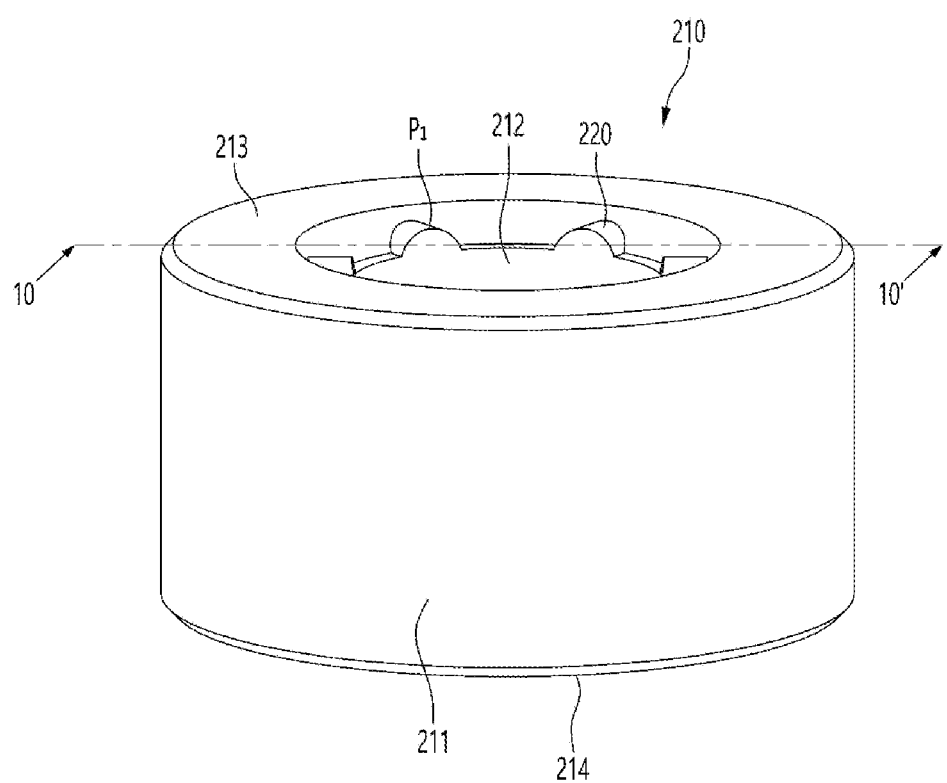
FIG. 9 is a diagram of a rotor viewed from the front according to an embodiment of the present disclosure.
Figure 10:
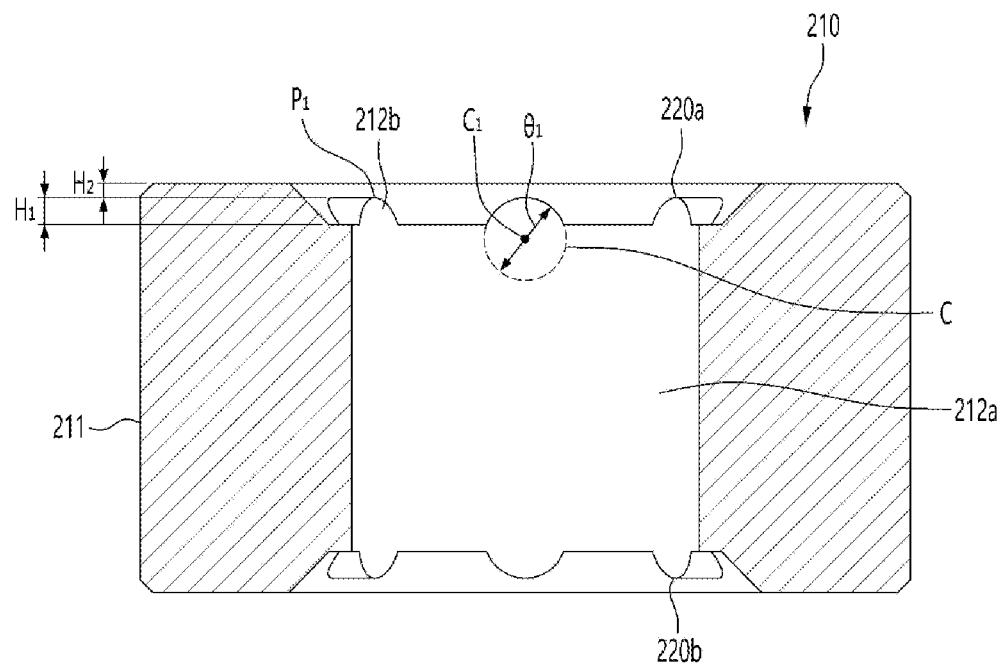
FIG. 10 is a cross-sectional view taken along 10-10' of FIG. 9.
Figure 11:
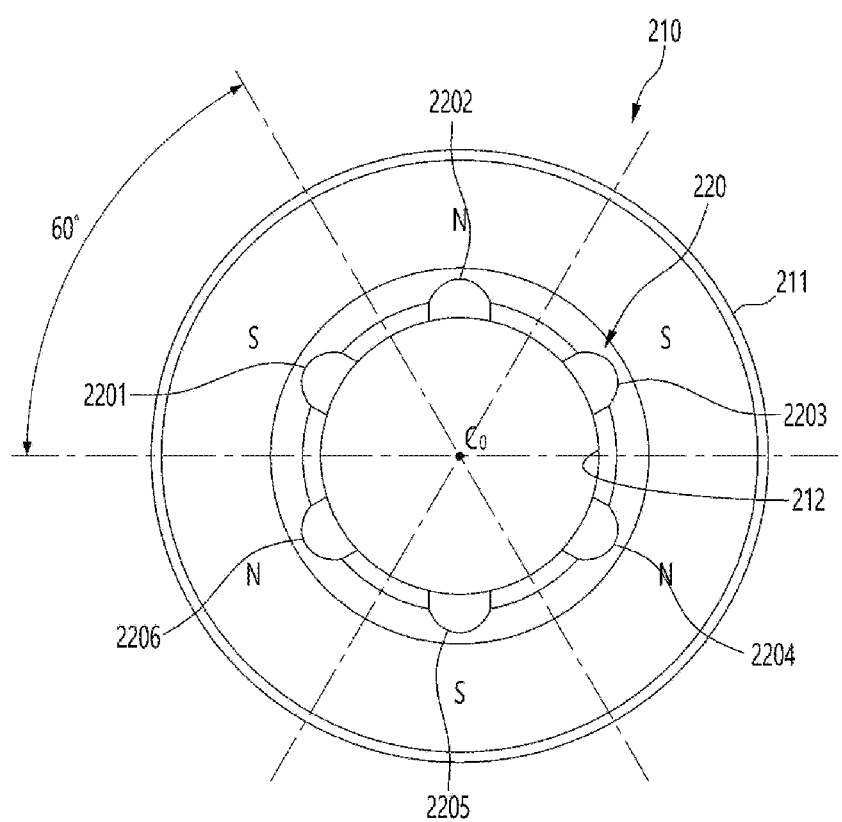
FIG. 11 is a plan view showing the configuration of a rotor according to an embodiment of the present disclosure.

FIG. 7 is a perspective view showing the configuration of a rotor according to an embodiment of the present disclosure. FIG. 8 is a schematic diagram showing a shape of a fixing protrusion of a rotor according to an embodiment of the present disclosure rotor. FIG. 9 is a diagram of a rotor viewed from the front according to an embodiment of the present disclosure. FIG. 10 is a cross-sectional view taken along 10-10' of FIG. 9. FIG. 11 is a plan view showing the configuration of a rotor according to an embodiment of the present disclosure.

Referring to FIGS. 7 to 11, the magnet 210 according to an embodiment of the present disclosure may have a ring shape formed through top and bottom. The magnet 210 may include an outer circumference part 211 having a curved surface extending in a circumferential direction and an inner circumference part 212 installed inside the outer circumference part 211 and extending in the circumferential direction.

The magnet 210 may include a first end 213 that forms an end surface of the magnet 210 to face the impeller 50, and a second end 214 that forms an end opposite to the first end 213. The end surface of the first end 213 may form a surface that is closest to the impeller 50.

The first end 213 may have an annular shape that extends in an inner radial direction of the magnet 210 from one side of the outer circumference part 211 of the magnet 210. The second end 214 may have an annular shape that extends in an inner radial direction of the magnet 210 from the other side of the outer circumference part 211 of the magnet 210.

It may be understood that the first end 213 forms the upper part of the magnet 210 and the second end 214 forms the lower part of the magnet 210, based on FIG. 7.

The magnet 210 may have a symmetrical shape in upward and downward directions. That is, based on FIG. 7, the same shape may be achieved by inverting the magnet 210 in upward and downward directions.

The magnet 210 may further include a taper part 215 that extends to be inclined in an inner radial direction of the magnet 210 from the first end 213. A direction in which the taper part 215 is inclined may be a direction toward the second end 214 from the first end 213, that is, a direction inclined in a downward direction based on FIG. 7.

The taper part 215 may also be provided at the second end 214. In detail, the taper part 215 may be further provided at the second end 214 to be inclined in the inner radial direction of the magnet 210. The taper part 215 provided at the first end 213 may be referred to as a "first taper part", and the taper part 215 provided at the second end 214 may be referred to as a "second taper part".

The direction in which the second taper part 215 is inclined may be a direction toward the first end 213 from the second end 214, that is, a direction inclined in an upward direction based on FIG. 7.

The taper part 215 may be understood as being inclined to prevent cracks from occurring in the magnet 210 when the magnet 210 is manufactured through compression and sintering.

This is because the possibility that cracks occur during a punching process of compression and sintering is high when a surface vertically extends downward from the first end 213 to form a step or a surface vertically extends upward from the second end 214 to form a step without the taper part 215.

The magnet 210 may further include an inner extension 216 that extends in an inner radial direction of the magnet 210 from the taper part 215. An inner surface of the inner extension 216 may be connected to the inner circumference part 212 of the magnet 210.

That is, a surface extending downward from the innermost end of the inner extension 216 connected to the first taper part 215 may form the inner circumference part 212. Similarly, a surface extending upward from the innermost end of the inner extension 216 connected to the second taper part 215 may form the inner circumference part 212.

The first end 213, the first taper part 215, and the inner extension 216 connected to the first taper part 215 may form an upper surface part of the magnet 210. The second end 214, the second taper part 215, and the inner extension 216 connected to the second taper part 215 may form a lower surface part of the magnet 210.

A fixing protrusion 220 for firmly coupling the magnet 210 and the shaft fixing member 250 may be provided at a side of the inner circumference part 212 of the magnet 210.

Compared with the first end 213 or the second end 214, the fixing protrusion 220 may be positioned close to the center of the inside of the magnet 210.

The fixing protrusion 220 may be formed on the taper part 215 or the inner extension 216. For example, the fixing protrusion 220 may be formed across the taper part 215 and the inner extension 216.

The fixing protrusion 220 may protrude from the taper part 215. In detail, the fixing protrusion 220 may inwardly protrude in a radial direction from an inclined surface of the taper part 215.

The fixing protrusion 220 may include a protrusion outer circumference part 223 that forms an outer surface. The protrusion outer circumference part 223 may have an outer surface having a predetermined curvature.

The protrusion outer circumference part 223 may be configured to form a portion of an outer circumference of a cylinder C. For example, the cylinder C may be defined as a figure having a predetermined diameter $\phi_1$ and a height H that extends from one point of the inner circumference part 212 of the magnet 210 to another point at an opposite side.

The center of a cross section of the cylinder C may be defined as $C_1$. A central axis of the cylinder C may be defined to extend in an inner radial direction from the inner circumference part 212 and to pass through the center $C_1$.

The fixing protrusion 220 may be provided in plural at a side of the inner circumference part 212 of the magnet 210, and the plurality of fixing protrusions 220 may be spaced apart from each other in a circumferential direction.

The number of the fixing protrusions 220 may correspond to the number of poles of the magnet 210. For example, the plurality of fixing protrusions 220 may include six fixing protrusions.

Referring to FIG. 11, based on an internal center $C_o$ of the magnet 210 having a ring shape, the magnet 210 may have six poles. The six poles may be arranged in a circumferential direction by alternating N and S poles. A region of each of the N and S poles may correspond to 60° based on the internal center $C_o$.

Each of the fixing protrusions 220 may be positioned in the region of each of the N and S poles. For example, the plurality of fixing protrusions 220 may include first to sixth magnet protrusions 2201 to 2206 that are arranged in a circumferential direction (clockwise).

A first magnet protrusion 2201 may face a fourth magnet protrusion 2204, and a second magnet protrusion 2202 may face a fifth magnet protrusion 2205. A third magnet protrusion 2203 may face a sixth magnet protrusion 2206.

The two facing magnet protrusions may constitute a portion and another portion of the outer circumference of the cylinder C as defined above. In detail, the outer circumference parts 223 of the two facing magnet protrusions may overlap a portion and another portion of the outer circumference of the cylinder C.

Since the six fixing protrusions 220 are provided, the three cylinders C may be defined, and the three cylinders C may have outer circumferences having the same shape and the same curvature.

The innermost surface of the fixing protrusion 220 in a radial direction may form the inner circumference part 212. In detail, the inner circumference part 212 may include a first inner circumference part 212a having a ring shape and a second inner circumference part 212b that protrudes from the first inner circumference part 212a and forms the innermost surface of the fixing protrusion 220.

From a different point of view, the inner circumference part 212 of the magnet 210 may include the first inner circumference part 212a having a ring shape and the second inner circumference part 212b that protrudes in a direction toward the first end 213 or the second end 214 from the first inner circumference part 212a and forms one surface of the fixing protrusion 220.

The fixing protrusion 220 positioned above the inner circumference part 212, that is, the second inner circumference part 212b of an upper protrusion 220a may protrude upward from the first inner circumference part 212a. The fixing protrusion 220 positioned below the inner circumference part 212, that is, the second inner circumference part 212b of a lower protrusion 220b may protrude downward from the first inner circumference part 212a.

Since the magnet 210 has a symmetrical shape in upward and downward directions, the upper protrusion 220a and the lower protrusion 220b may have the same shape and the same size. The upper protrusion 220a and the lower protrusion 220b may be provided in plural, and the plurality of upper protrusions 220a and the plurality of lower protrusions 220b may be arranged on the inner circumference part 212 in a circumferential direction.

The plurality of upper protrusions 220a and the plurality of lower protrusions 220b may be arranged at the same interval in a circumferential direction.

The uppermost part of the upper protrusion 220a may form a tip $P_1$. The lowermost part of the lower protrusion 220b may form the tip $P_1$. For convenience of description, the shape and size of the fixing protrusion 220 will be described based on the upper protrusion 220a.

A distance from the tip $P_1$ of the upper protrusion 220a to the lower part of the upper protrusion 220a, i.e., to the lower part of the second inner circumference part 212b connected to the first inner circumference part 212a may be defined as a protrusion height $H_1$. A distance to the tip $P_1$ from the first end 213 may be defined as a protrusion depth $H_2$.

The tip $P_1$ of the upper protrusion 220a may be formed at a lower position than the first end 213. That is, a distance from the tip $P_1$ of the upper protrusion 220a to the upper part of the first inner circumference part 212a may formed to be smaller than the distance to the upper part of the first inner circumference part 212a from the first end 213.

This is because, since the shaft fixing member 250 is provided outside the upper protrusion 220a, when the upper protrusion 220a protrudes in an upward direction of the first end 213, it is difficult to stably fix the shaft fixing member 250 to the upper protrusion 220a.

When the height $H_1$ of the upper protrusion 220a is constant, as the diameter $\phi_1$ of the cylinder C is reduced, a function of preventing the rotation shaft 260 from being idle may be improved, but the possibility that cracks occur while the magnet 210 is molded may be increased.

When the diameter $\phi_1$ of the cylinder C is constant, as the height $H_1$ of the upper protrusion 220a is increased, the function of preventing the rotation shaft 260 from being idle may be improved, but the thickness of the shaft fixing member 250 covering the upper protrusion 220a may be reduced, and thus the possibility of poor injection molding of the shaft fixing member 250 may be increased.

Accordingly, the present embodiment may propose that the protrusion height $H_1$ be formed to be larger than the protrusion depth $H_2$.

A description of the protrusion height and protrusion depth of the lower protrusion 220b may apply the above description of the protrusion height and protrusion depth of the upper protrusion 220a. This is because the magnet 210 has the symmetrical shape in upward and downward directions, as described above.

Figure 12:
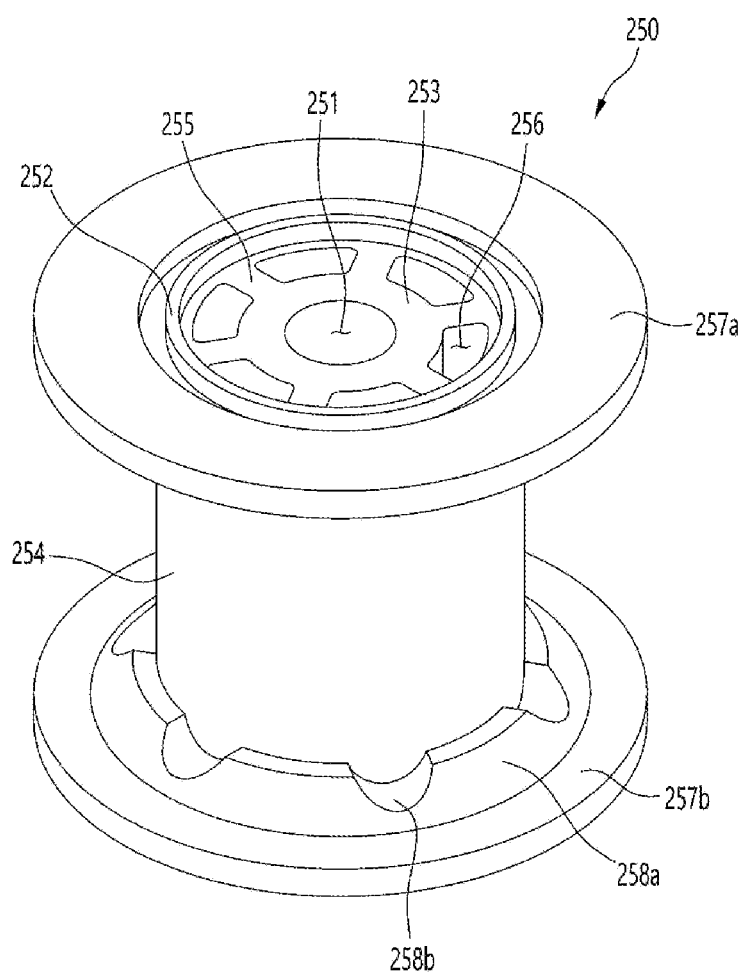
FIG. 12 is a top perspective view showing the configuration of a shaft fixing member according to an embodiment of the present disclosure.
Figure 13:
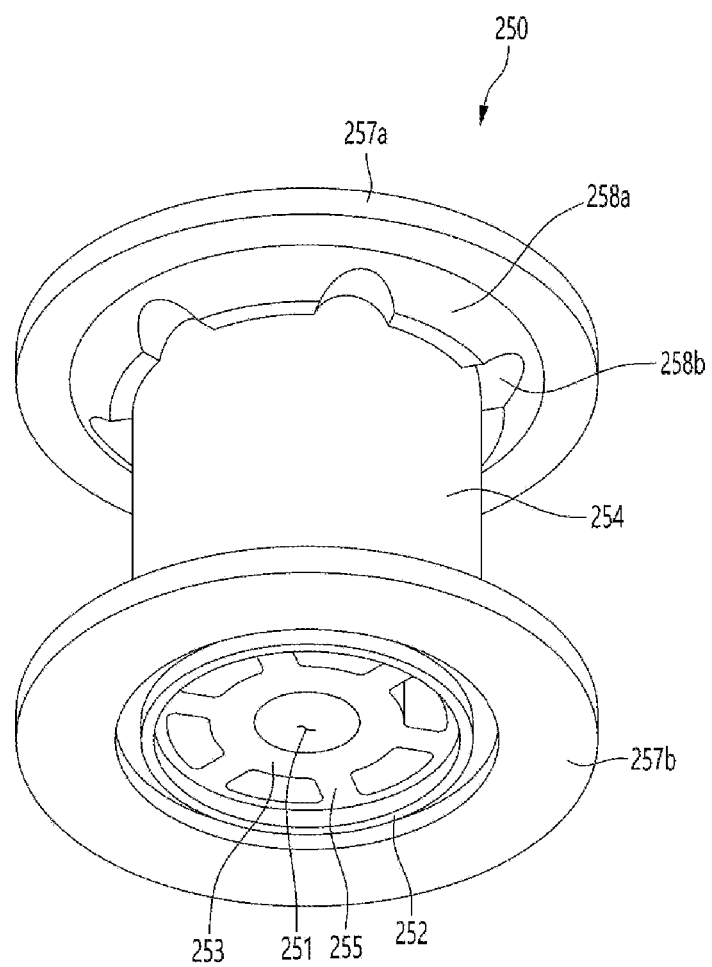
FIG. 13 is a bottom perspective view showing the configuration of a shaft fixing member according to an embodiment of the present disclosure.
Figure 14:
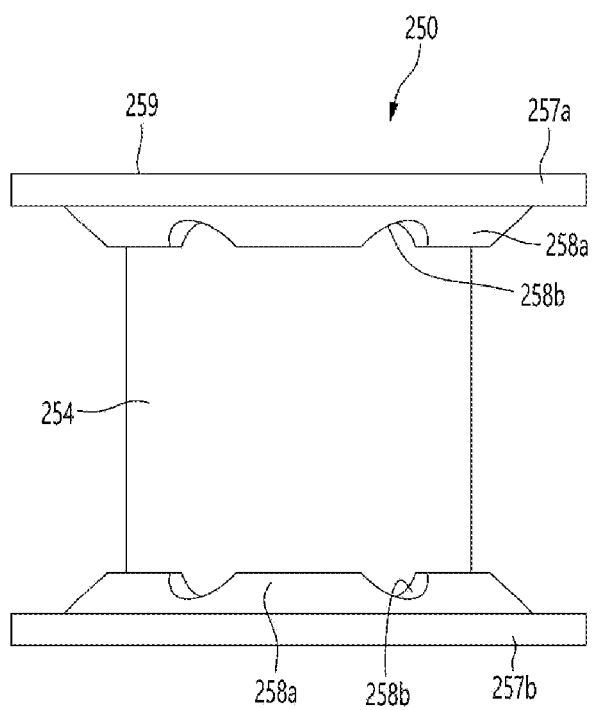
FIG. 14 is a front view showing the configuration of the shaft fixing member of FIG. 12 according to an embodiment of the present disclosure.
Figure 15:
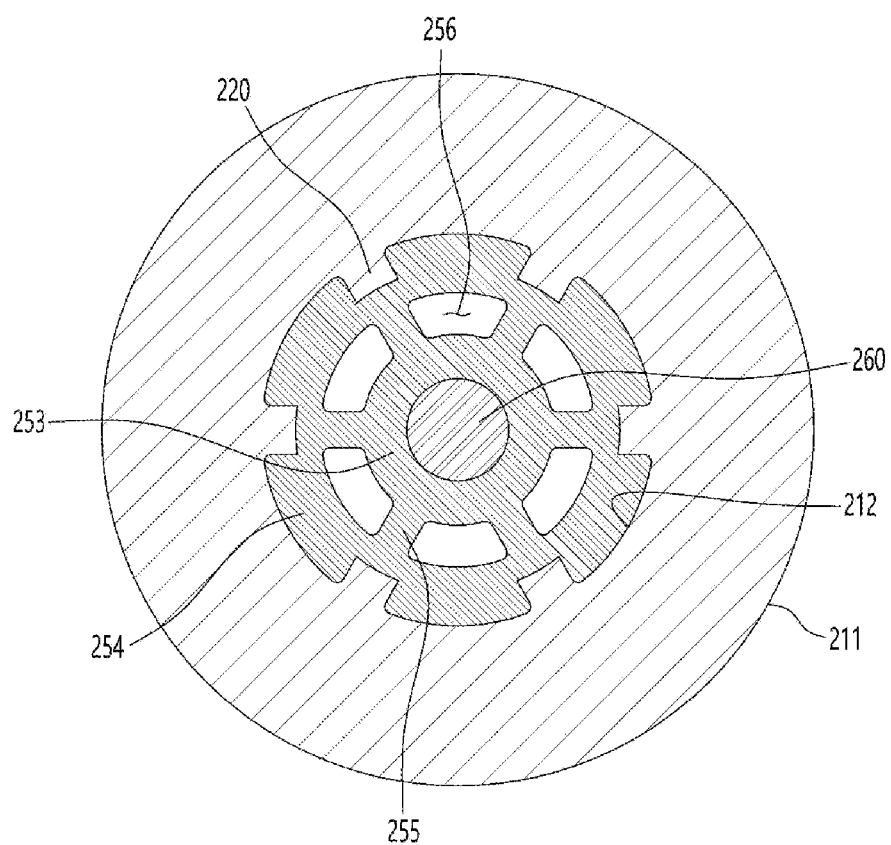
FIG. 15 is a cross-sectional view taken along 15-15' of FIG. 5.

FIG. 12 is a top perspective view showing the configuration of a shaft fixing member according to an embodiment of the present disclosure. FIG. 13 is a bottom perspective view showing the configuration of a shaft fixing member according to an embodiment of the present disclosure. FIG. 14 is a front view showing the configuration of the shaft fixing member of FIG. 12 according to an embodiment of the present disclosure. FIG. 15 is a cross-sectional view taken along 15-15' of FIG. 5.

Referring to FIGS. 12 to 15, the shaft fixing member 250 according to an embodiment of the present disclosure may be configured to support the magnet 210 and the rotation shaft 260 in order to firmly fix the magnet 210 and the rotation shaft 260.

The shaft fixing member 250 may be configured using an insert molding method in the state in which the magnet 210 and the rotation shaft 260 are assembled.

The shaft fixing member 250 may have a symmetrical shape in upward and downward directions so as to correspond to the shape of the magnet 210.

The shaft fixing member 250 may include the shaft support 253 that surrounds the outside of the rotation shaft 260 and is hollow inside, and the magnet support 254 that surrounds the outside of the shaft support 253 and supports the inner circumference of the magnet 210. The magnet support 254 may have a cylindrical shape that is hollow inside.

The shaft fixing member 250 may include the first connector 255 for connecting the shaft support 253 and the magnet support 254, and the recess 256 defined by the shaft support 253, the magnet support 254, and two adjacent first connectors 255.

The shaft fixing member 250 may further include the second connector 259 that is provided inside the recess 256, connects the shaft support 253 and the magnet support 254, and radially extends toward the magnet support 254 from the shaft support 253.

The shaft fixing member 250 may further include the first step support 257a that extends in an outer radial direction from the upper part of the magnet support 254 and covers a portion of the upper of the magnet 210. The first step support 257a may have a ring shape.

The first step support 257a may include a washer rib 252 that defines an accommodating space of the first washer 281. The washer rib 252 may protrude upward from the first step support 257a and may be formed in a circumferential direction. The first washer 281 may be installed in an internal space of the washer rib 252.

The shaft fixing member 250 may include the second step support 257b that extends in an outer radial direction from the lower part of the magnet support 254 and covers a portion of the lower part of the magnet 210. The second step support 257b may have a ring shape.

The second step support 257b may include the washer rib 252. A description of the washer rib 252 of the second step support 257b may apply the above description of the washer rib 252 of the first step support 257a. The second washer 285 may be installed in the internal space of the washer rib 252 of the second step support 257b.

A flange for supporting the upper surface part of the magnet 210 may be formed at an intersection between the magnet support 254 and the first step support 257a. The flange may include a flange part 258a in contact with the taper part 215 of the magnet 210. The flange part 258a may include an inclined surface corresponding to the taper part 215 of the magnet 210.

A fixing groove 258b for supporting the fixing protrusion 220 of the magnet 210 may be formed in the flange part 258a. The fixing groove 258b may be formed by recessing at least a portion of the flange part 258a. The fixing protrusion 220 may be accommodated inside the fixing groove 258b in such a way that the flange part 258a surrounds the outside of the fixing protrusion 220.

The fixing protrusion 220 and the fixing groove 258b may be configured to form bearing power in a direction that intersects or interferes with the rotation direction of the magnet 210 and the rotation shaft 260.

That is, the fixing protrusion 220 may be accommodated in the fixing groove 258b and the flange part 258a may support opposite sides in a circumferential direction of the fixing protrusion 220, and thus when the magnet 210 and the rotation shaft 260 rotates, the flange part 258a may rotate with the magnet 210 in the circumferential direction and may be prevented from being separated from the magnet 210.

The plurality of fixing grooves 258b may be formed to correspond to the number of the fixing protrusions 220 of the magnet 210, and the plurality of fixing grooves 258b may be formed in the circumferential direction of the flange part 258a.

As described above, the shaft fixing member 250 may have a symmetrical shape in upward and downward directions, and thus the flange part 258a and the fixing groove 258b may also be provided in the same way at an intersection between the magnet support 254 and the second step support 257b.

As such, structures for supporting the fixing protrusion 220 of the magnet 210 may be provided above and below the shaft fixing member 250, respectively, and thus a strong coupling state between the magnet 210 and the shaft fixing member 250 may be maintained.

Figure 16A:
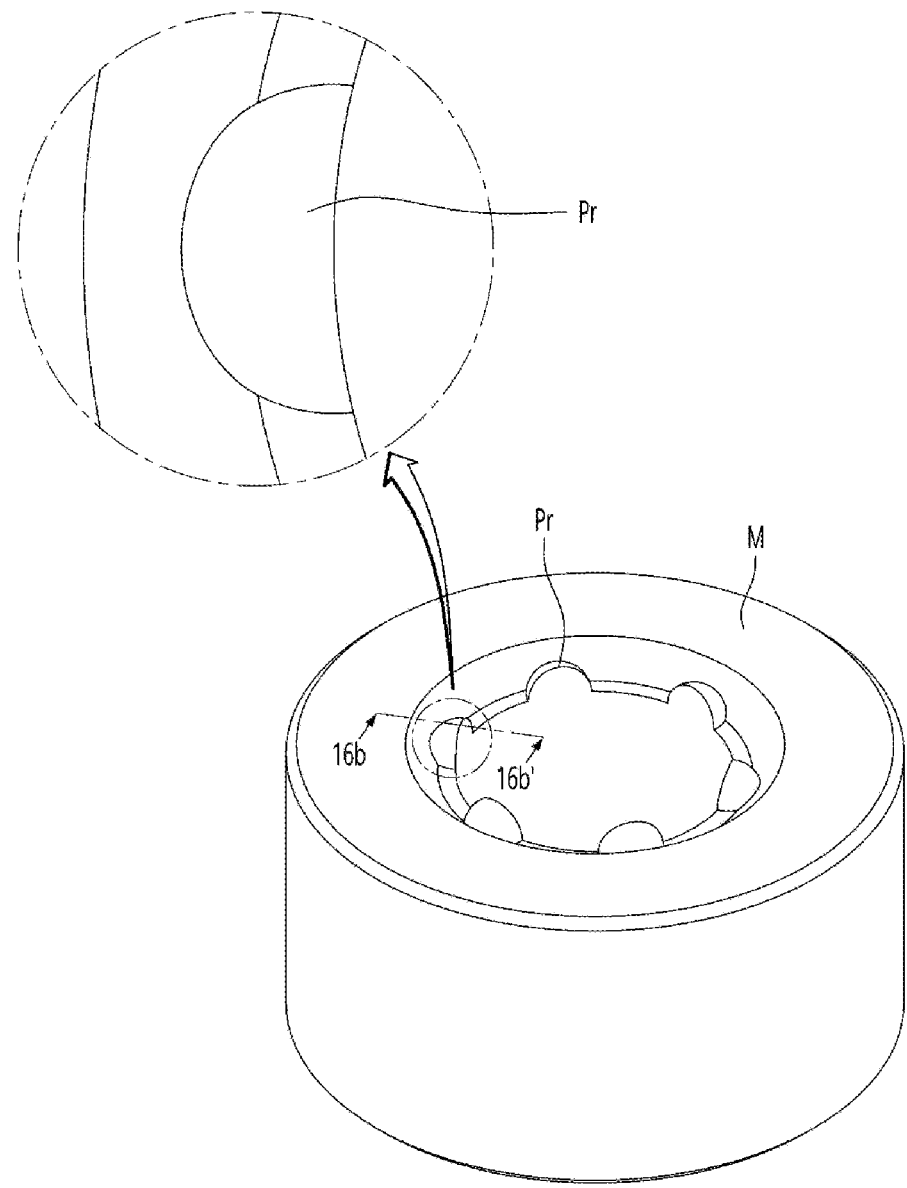
FIGS. 16A and 16B are schematic diagrams showing the case in which cracks occurs during a procedure of molding a rotor when a spherical fixing protrusion of a rotor is provided.
Figure 16B:
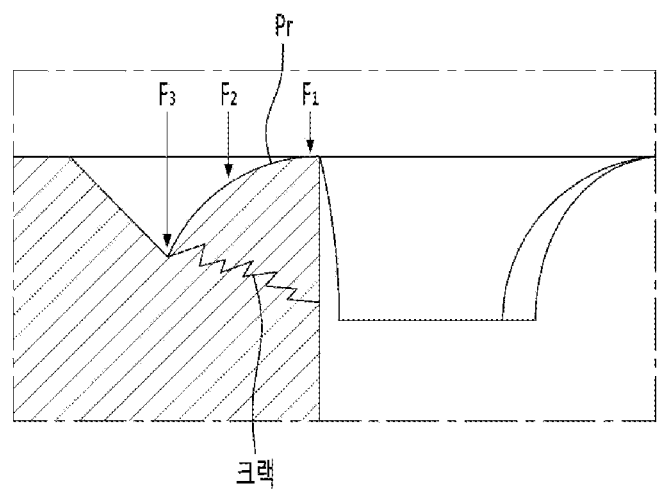

FIGS. 16A and 16B are schematic diagrams showing the case in which cracks occurs during a procedure of molding a rotor when a spherical fixing protrusion of a rotor is provided.

FIGS. 16A and 16B shows a problem when a fixing protrusion $P_r$ included in a magnet M has a shape of a partial outer circumference of a sphere but not a shape of a partial outer circumference of a cylinder, differently from embodiments of the present disclosure.

When the fixing protrusion $P_r$ has a shape of a partial outer circumference of a sphere, a radius of curvature of the fixing protrusion $P_r$ may be relatively small due to the geometric characteristics of the sphere. When the radius of curvature of the fixing protrusion $P_r$ is small, a degree by which the fixing protrusion $P_r$ is bent at a tip thereof may be increased. That is, a step difference of the fixing protrusion $P_r$ may be increased.

A punching process may be performed while the magnet M is molded through compression and sintering, and in this case, force applied by punching may become non-uniform. That is, with regard to force shown in FIG. 16B, a size difference between first force $F_1$ applied to the tip of the fixing protrusion $P_r$ and forces $F_2$ and $F_3$ applied toward the center of the fixing protrusion $P_r$ may be relatively high.

Accordingly, the density of the magnet M may become non-uniform when the magnet M is molded, and thus the possibility that cracks occur in the magnet M may be increased.

Figure 17A:
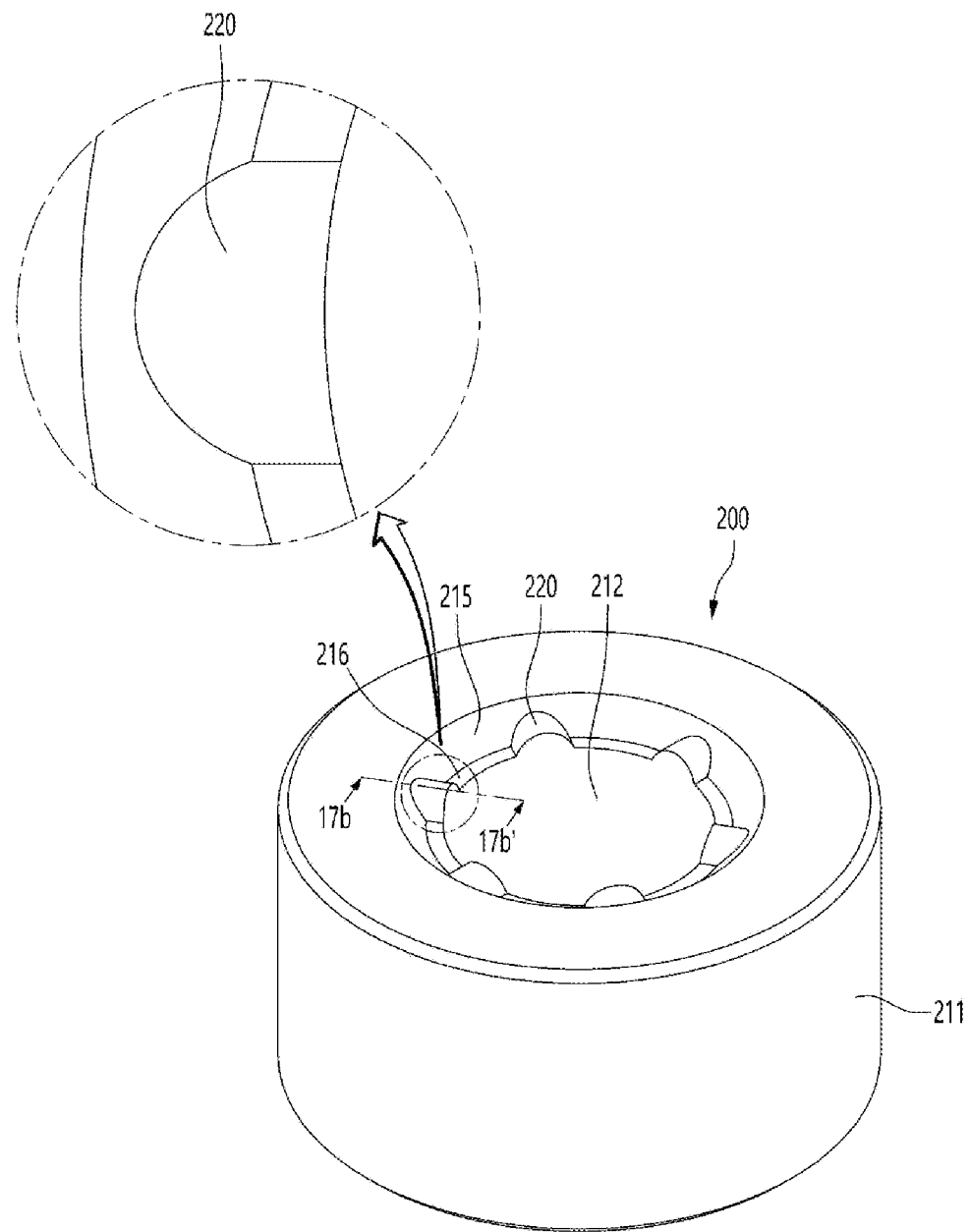
FIGS. 17A and 17B are schematic diagrams showing the case in which cracks occurs during a procedure of molding a rotor when a spherical fixing protrusion of a rotor is provided.
Figure 17B:
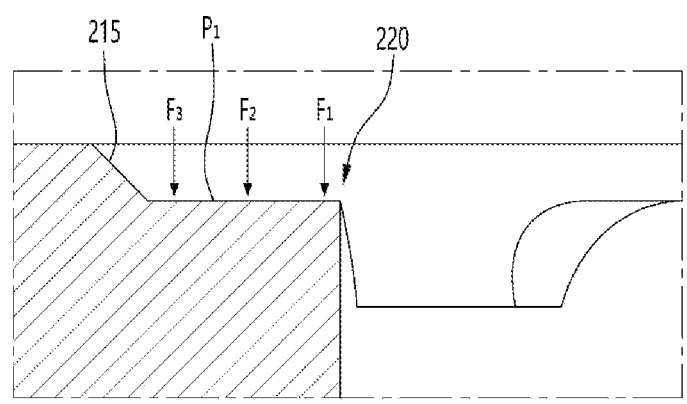

FIGS. 17A and 17B are schematic diagrams showing the case in which cracks occurs during a procedure of molding a rotor when a spherical fixing protrusion of a rotor is provided.

Differently from FIGS. 16A and 16B, referring to FIGS. 17A and 17B, the fixing protrusion 220 of the magnet 210 according to an embodiment of the present disclosure may have a shape of a partial outer circumference of a cylinder.

When the fixing protrusion 220 has a shape of a partial outer circumference of a cylinder, a radius of curvature of the fixing protrusion 220 may be relatively large due to the geometric characteristics of the cylinder. When the radius of curvature of the fixing protrusion 220 is large, the fixing protrusion 220 may be formed in such a way that the length of the tip of the fixing protrusion 220 is relatively long in an inner radial direction.

As a result, the length of the tip of the fixing protrusion 220 may be increased, and thus force applied by punching may become uniform during a procedure of compressing and sintering the magnet M. That is, with regard to force shown in FIG. 17B, first to third forces F1', F2', and F3' applied to the tip of the fixing protrusion 220 may be uniformly applied in an inner radial direction.

Accordingly, the density of the magnet 210 may become uniform when the magnet 210 is molded, and thus the possibility that cracks occur in the magnet M may be increased.

[Table 1] below shows results of testing whether there is a change in performance of a motor by comparing the case in which the fixing protrusion 220 is formed on the magnet 210 according to the present embodiment with a control group in which a concave groove is formed in a magnet.

TABLE 1

| Division | Control group (concave groove) | The present disclosure (fixing protrusion) |
|---|---|---|
| Back electromotive force (BEMF) | 3.75 Vrms | 3.77 Vrms |

As seen from [Table 1] above, compared with the control group, when a fixing protrusion is formed on a magnet according to an embodiment of the present disclosure, magnetism of the magnet 210 is strengthened, and accordingly, back electromotive force (BEMF) indicating performance of the motor is increased by about 5%.

In summary, the magnet 210 and the rotation shaft 260 may be firmly fixed by providing the fixing protrusion 220 on the magnet 210 and forming the fixing groove 258b for supporting the fixing protrusion 220 in the shaft fixing member 250. The size of the magnet 210 may be increased to increase magnetism by as much as a portion corresponding to the fixing protrusion 220, thereby improving back electromotive force of the motor.

The embodiments of the present disclosure may provide a fixing device of a rotor, a shaft fixing member, and a rotation shaft, thereby preventing the shaft fixing member from being separated from the rotor and preventing the rotation shaft from being idle.

The shaft fixing member may be provided inside the rotor using an insert molding method, and the fixing device may be provided in a direction that intersects or interferes with the rotation direction of the rotor, and thus the rotor and the rotation shaft may be firmly coupled.

The fixing device may include a fixing protrusion provided on any one of the rotor and the shaft fixing member, and a fixing groove for supporting the fixing protrusion, and thus the fixing device may be easily positioned in a direction that interferes with (intersects) the rotation direction of the rotor.

The rotor may have a ring shape formed through top and bottom, and the fixing protrusion may protrude from an inner circumference of the rotor, and thus the shaft fixing member and the rotor may be firmly coupled.

The fixing protrusion may have a shape with a small step difference in a penetration direction of the rotation shaft.

For example, the fixing protrusion may be configured to have the same step difference having a predetermined length or greater in a radial direction, thereby preventing cracks from occurring during a procedure of molding the rotor.

What is claimed is:

1. A motor comprising:
a rotation shaft;
a permanent magnet disposed at an outer circumference of the rotation shaft, the permanent magnet having a ring shape and including an outer circumference part and an inner circumference part; and
a shaft fixing member configured to fix the permanent magnet and the rotation shaft, the shaft fixing member including a fixing groove,
wherein the permanent magnet further includes:
an end extending in an inner radial direction of the permanent magnet from the outer circumference part,
a taper part extending from the end to be inclined toward an inside of the permanent magnet,
an inner extension extending in the inner radial direction of the permanent magnet from the taper part and connected to the inner circumference part, and
a fixing protrusion that protrudes upward in an axial direction from the inner extension towards the end and is configured to be accommodated in the fixing groove, the fixing protrusion has a predetermined curvature,
wherein the fixing protrusion includes a plurality of fixing protrusions that are provided along a circumferential direction of the inner circumference part of the permanent magnet, one of the plurality of fixing protrusions and another one of the plurality of fixing protrusions being disposed across from each other at opposite sides of the inner circumference part and define a portion of an outer circumference of a same cylinder, and
wherein a first distance from the inner extension to the end is greater than a second distance from the inner extension to an uppermost tip of the fixing protrusion,
wherein a first length of the uppermost tip of the fixing protrusion in the inner radial direction is greater than a second length of the inner extension in the inner radial direction, and
wherein the fixing protrusion includes an innermost surface that extends downward in the axial direction from the uppermost tip of the fixing protrusion and is coplanar with the inner circumference part.

2. The motor of claim 1, wherein the end of the permanent magnet is a first end extending in the inner radial direction of the permanent magnet from a first side of the outer circumference part,
wherein the permanent magnet further comprises a second end extending in the inner radial direction of the permanent magnet from a second side of the outer circumference part, the second end being opposed to the first end, and
wherein a distance from the fixing protrusion to a center of the permanent magnet is less than a distance from the first end or the second end of the permanent magnet to the center of the permanent magnet.

3. The motor of claim 2, wherein the fixing protrusion is provided at an inner circumference of the first end and an inner circumference of the second end.

4. The motor of claim 2, wherein the shaft fixing member comprises:
a shaft support that supports the outer circumference of the rotation shaft and configured to fix the rotation shaft; and
a magnet support that surrounds the shaft support and supports the inner circumference part of the permanent magnet.

5. The motor of claim 4, wherein the shaft fixing member further comprises:
a first step support extending in an outer radial direction from one end of the magnet support and covering a portion of the first end of the permanent magnet; and
a second step support extending in an outer radial direction from another end of the magnet support and covering a portion of the second end of the permanent magnet,
wherein the fixing groove is recessed into a flange that is provided at an intersection between the magnet support and the first step support or at an intersection between the magnet support and the second step support.

6. The motor of claim 5, wherein:
the flange includes a flange part having an inclined surface supported by the taper part of the permanent magnet; and
the fixing groove is recessed in the flange part.

7. The motor of claim 1, wherein the innermost surface of the fixing protrusion extends upward in the axial direction from the inner circumference part of the permanent magnet.

8. The motor of claim 1, wherein the fixing protrusion is coupled to the taper part such that the fixing protrusion is provided across the taper part and the inner extension.

9. The motor of claim 1, wherein the fixing protrusion comprises a protrusion outer circumference part having the predetermined curvature, wherein the predetermined curvature has a shape that corresponds to a portion of an outer circumference of the same cylinder, and wherein the protrusion outer circumference part includes a pair of end portions to connect to the inner extension, and the uppermost tip of the fixing protrusion defines an uppermost portion of the protrusion outer circumference part.

10. The motor of claim 1, wherein:

the plurality of fixing protrusions comprise six fixing protrusions, wherein a number of fixing protrusions corresponds to a number of poles of the permanent magnet;

a first fixing protrusion and a fourth fixing protrusion of the six fixing protrusions define a portion of an outer circumference of a first cylinder;

a second fixing protrusion and a fifth fixing protrusion of the six fixing protrusions define a portion of an outer circumference of a second cylinder; and a third fixing protrusion and a sixth fixing protrusion of the six fixing protrusions define a portion of an outer circumference of a third cylinder.

11. A drain pump comprising:

the motor of claim 1; and an impeller coupled to the motor.

12. The motor of claim 1, wherein the second distance from the inner extension to the uppermost tip of the fixing protrusion is greater than a third distance from the uppermost tip of the fixing protrusion to the end.

13. The motor of claim 1, wherein the taper part includes a portion that extends from the uppermost tip of the fixing protrusion to be inclined and connects to the end of the permanent magnet.

\* \* \* \* \*